July 22, 1947.   H. BÜTTNER   2,424,382
SPRING FILLING FOR MATTRESSES, SOFAS, SEATS, CUSHIONS OR THE LIKE
Filed June 28, 1938

Inventor,
Hugo Büttner,
By Frank S. Appleman,
Attorney,

Patented July 22, 1947

2,424,382

UNITED STATES PATENT OFFICE 2,424,382

SPRING FILLING FOR MATTRESSES, SOFAS, SEATS, CUSHIONS, OR THE LIKE

Hugo Büttner, Wuppertal-Vohwinkel, Germany; vested in the Attorney General of the United States Application June 28, 1938, Serial No. 216,367
In Germany June 29, 1937

Sections 3 and 14, Public Law 690, August 8, 1946.
Patent expires June 29, 1957

1 Claim. (Cl. 5—248)

The present invention is concerned with a spring filling or assembly for mattresses, sofas, cushions, seats or other upholstery or upholstered furniture, comprising a plurality of side-by-side coiled or helical springs.

According to the invention, adjacent springs are connected together by connecting members so engaged with the springs as to be capable of performing the function of hinges, whereby the springs are mutually supporting and prevented from lateral displacement but are capable of flexing in the direction of the load.

The clips are preferably connected to the turns of wire at points rotationally staggered by 90°.

To obtain a particularly soft-sprung surface, e. g. for a cushion, the spring may be so arranged that adjacent springs are wound by the same pitch but in opposite senses. This has the further advantage that the connecting members, which are suitably in the form of sheet metal clips and have rolled-over ends each of which encircles the wire of the corresponding spring and so acts as a hinge, may be of flat form and engage parallelly inclined parts of the two adjacent springs.

If the turns of all the springs in the assembly are in the same sense, the parts of adjacent springs to be connected will have opposite inclinations, and consequently the connecting clips must be twisted. The rolled-over, wire engaging ends of the clips are not then parallel but are oppositely inclined one to the other.

When the clips are constructed in this way, they set up a certain amount of resistance to the load, and thus with springs arranged in the same sense, the assembly is "harder" than one in which the springs are alternately left-hand and right-hand wound.

Another important advantage of the filling according to the invention is that the hitherto usual retaining frame is eliminated. Furthermore, with the filling according to the invention, the upper and/or lower end windings of the springs can be arranged in the same plane, whereby the bumps on the upper and/or lower surface of the filling, which has previously been met with and is due to upstanding or outwardly bent lengths of spring, are eliminated.

Thus the assembly is easier to cover with upholstery and material for the latter is saved.

Figure 1:
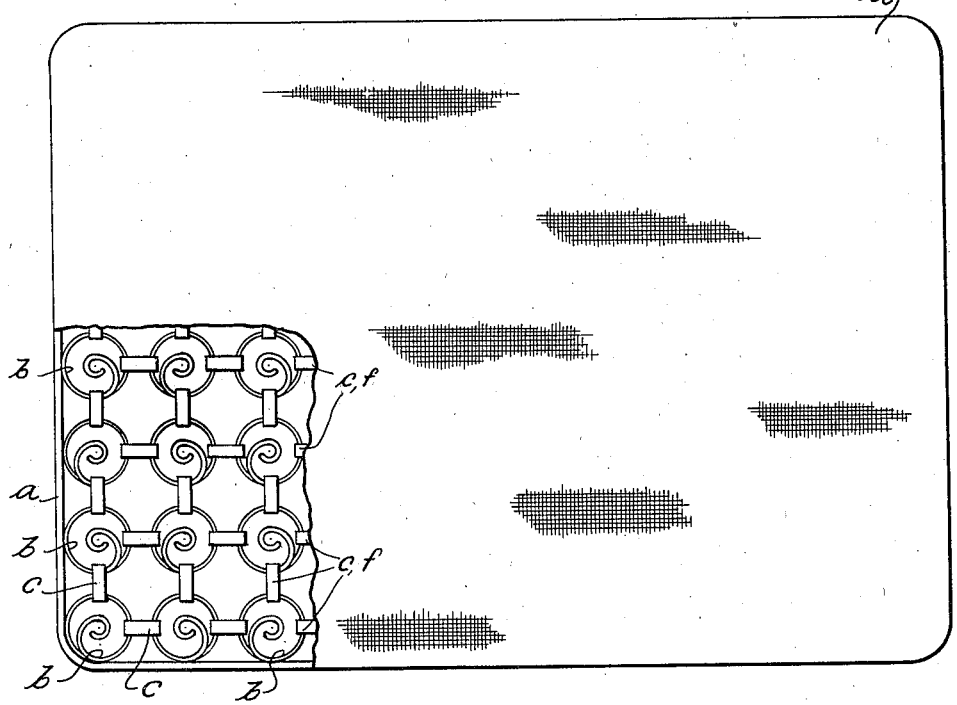
Figure 2:
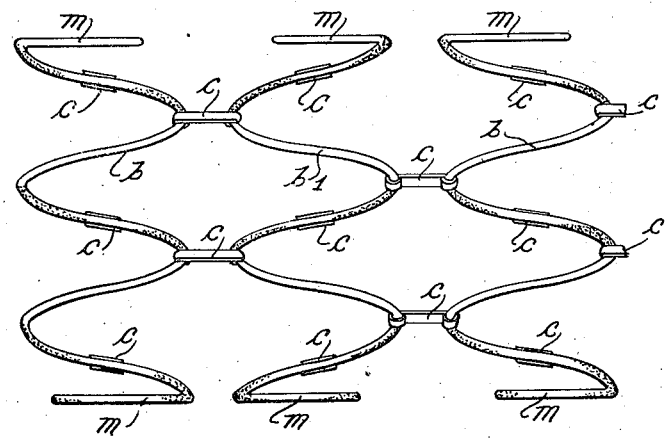

Two examples of embodiment of the invention are illustrated in the accompanying drawings, in which:

Figure 1 is a plan view of a spring assembly according to the present invention shown incorporated in a mattress, Figure 2 is a partial side view of a spring filling according to the invention with oppositely wound springs.

In Fig. 1, the spring assembly is shown arranged in a covering $a$, such assembly comprising a large number of spaced, upstanding helical springs $b$. Each of these springs is rigidly, but hingedly, connected at a plurality of points along its length with the corresponding turns of adjacent springs, so that the corresponding turns of adjacent springs are mutually supporting in a direction transverse to the longitudinal central axes of the springs.

A spring assembly constructed in this fashion renders superfluous the retaining frame which has hitherto been employed for spring assemblies of this nature, when used in spring cushions and so on.

From Fig. 2 it can be seen that the parts of corresponding turns of adjacent springs, which parts are rotationly staggered by 90° one with respect to the next, are connected by flat strips $c$ of sheet metal. These strips $c$ have rolled-over ends which engage the spring wire hinge-fashion.

The springs are so arranged in Fig. 2 that a left-hand wound spring $b'$ follows a right-hand wound spring $b$. This has the advantage that the parts of the coils to be connected have the same inclination and therefore, when the springs are compressed, the clips $c$ move with these springs in the manner of a hinge.

As is illustrated in Fig. 2, each individual spring terminates at its upper and in a turn $m$ of reduced diameter. Owing to the fact that the usual interconnection of the springs at their upper and lower ends is dispensed with, all the windings $m$ may be arranged in a single horizontal plane. In this way, not only are undesirable bulges in the upper and/or lower surface of the cushion or the like eliminated, but there is also a saving in upholstering material.

I claim:

A spring filling for mattresses, sofas, cushions and the like, having cylindrical coils functioning independently of each other and wound alternately right and left hand when seen from the same end, said filling being characterized in that the convolutions intermediate the ends of each adjacent oppositely wound spring are connected by means of rigid links while the end convolutions of each spring are free from connection with the end convolutions of the adjacent springs.

HUGO BÜTTNER.

REFERENCES CITED

The following references are of record in the file of this patent:

UNITED STATES PATENTS

| Number | Name | Date |
|---|---|---|
| 1,637,584 | Owen et al. | Aug. 2, 1927 |
| 2,001,964 | Kimbrig | May 21, 1935 |
| 1,842,439 | Wisner | Jan. 26, 1932 |
| 1,372,702 | Kreuzkamp | Mar. 29, 1921 |
| 1,963,055 | Powers | June 12, 1934 |
| 1,950,770 | Bayer | Mar. 13, 1934 |

FOREIGN PATENTS

| Number | Country | Date |
|---|---|---|
| 447,317 | Germany | July 19, 1927 |